(No Model.)
M. PRECHTEL.
TONGUE SUPPORT.
No. 372,235. Patented Oct. 25, 1887.
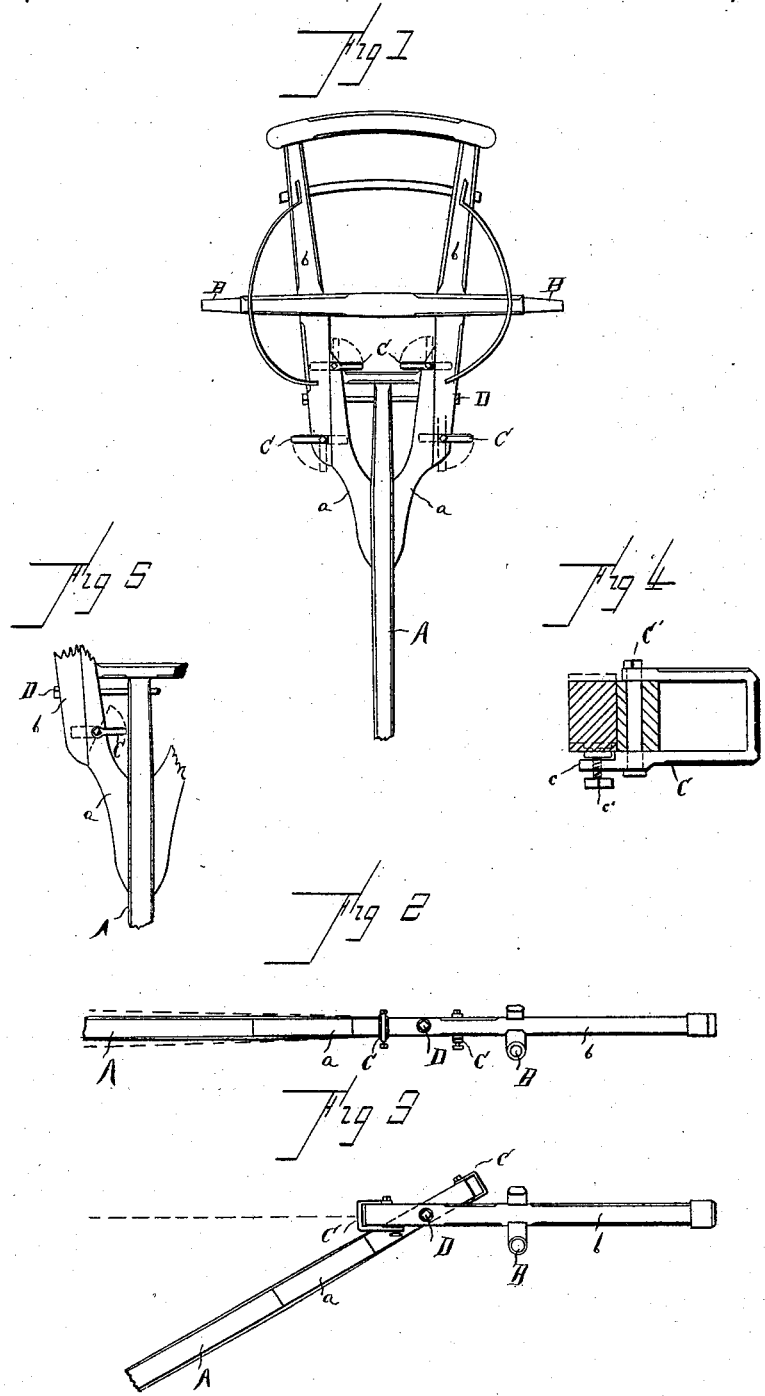

UNITED STATES PATENT OFFICE.

MICHAEL PRECHTEL, OF CLEVELAND, OHIO.

TONGUE-SUPPORT.

SPECIFICATION forming part of Letters Patent No. 372,235, dated October 25, 1887.

Application filed June 1, 1887. Serial No. 239,960. (No model.)

*To all whom it may concern:*

Be it known that I, MICHAEL PRECHTEL, of Cleveland, in the county of Cuyahoga and State of Ohio, have invented certain new and useful Improvements in Tongue-Supporters for Vehicles; and I do hereby declare the following to be a full, clear, and exact description of the invention, such as will enable others skilled in the art to which it pertains to make and use the same.

My invention relates to improvements in tongue-supporters for vehicles; and it consists in certain features of construction, and in combination of parts, hereinafter described, and pointed out in the claims.

In the accompanying drawings, Figure 1 is a plan view showing a portion of the tongue and hound complete with my improved device attached. Figs. 2 and 3 are side elevations, showing, respectively, the tongue-supporters in operative and inoperative positions. Fig. 4 is an enlarged side elevation of a tongue-supporter detached. Fig. 5 is a plan view showing a modification hereinafter described.

A represents a tongue of a vehicle, $a$ the tongue-hounds, B the axle, $b$ the hounds connected with the axle, and D the draw-bolt, all of which may be of ordinary construction.

C is a tongue-supporter, one or more of which may be used according to circumstances. The tongue-supporter, in the main, is in the form of a clevis or bail, C, made to embrace one of the hounds with a securing bolt or pin, C', and an arm, $c$, the latter being made long enough to overlap the adjacent hound when the device is in position crosswise of the hound. The arm $c$ is provided with a thumb screw, $c'$, for adjusting the position of the tongue to a more or less elevated position. A preferable arrangement of the supporters is shown in Fig. 1, where a supporter, by means of the bolt or pin C', is attached to each hound $a$, so near the rear end of the latter that the bail may be turned lengthwise or crosswise of the hound. When the bail is turned crosswise, the arm $c$ is made to extend under the adjacent hound $b$, and of course holds the free end of the tongue elevated. By turning the thumb-screw $c'$ in or out the free end of the tongue is elevated or depressed and may be brought to the desired position. For light work two supporters thus located, or even one, may be made to answer the purpose.

For heavier work preferably two other supporters are mounted on the forward end of the respective hounds $b$ and are operated in the manner just described. Plates should be attached to the hounds to receive the thrust of the thumb-screws, so as not to mar the wood-work. By loosening the thumb-screws and turning the bail substantially lengthwise of the hound, so that the arms $c$ are brought opposite the hounds to which the bails are attached, the devices are rendered inoperative, and the tongue is consequently left free, such position of parts being shown in dotted lines, in which case the thumb-screws should be tightened to hold the devices from rattling.

In Fig. 5 one of the forward supporters is shown pivoted to one of the tongue hounds $a$, and with this arrangement the supporters should be inverted, so that the arm $c$ may extend above the hound $d$.

These supporters are simple, cheap, and effective, and are not liable to get out of order.

What I claim is—

1. The combination, with vehicle tongue and hound, substantially as indicated, of a tongue-supporter, the same consisting, essentially, of a bail made to embrace a hound and pivotally secured thereto by bolt or pin, an arm integral with the bail, for overlapping the adjacent hound when the bail is turned crosswise of the hound, and a thumb-screw connected with the said arm for engaging the opposing hound for adjusting the position of the tongue, substantially as set forth.

2. The combination, with vehicle tongue and hound, of a bail pivotally attached to a hound in position to be turned crosswise or lengthwise of such hound, an arm connected with the bail for overlapping the adjacent hound, and a screw connected with such arm for adjusting the position of the tongue, the parts being arranged substantially as set forth.

In testimony whereof I sign this specification, in the presence of two witnesses, this 29th day of April, 1887.

MICHAEL PRECHTEL.

Witnesses:
CHAS. H. DORER,
ALBERT E. LYNCH.